US010012224B2

(12) United States Patent
Li et al.

(10) Patent No.: US 10,012,224 B2
(45) Date of Patent: Jul. 3, 2018

(54) CRANK CIRCULAR SLIDING BLOCK MECHANISM, PARTS THEREOF, AND EQUIPMENT THEREFROM

(75) Inventors: Ming Li, Beijing (CN); Zhengzhong Li, Beijing (CN)

(73) Assignee: Beijing Sinocep Engine Technology Co., Ltd., Beijing (CN)

( * ) Notice: Subject to any disclaimer, the term of this patent is extended or adjusted under 35 U.S.C. 154(b) by 311 days.

(21) Appl. No.: 13/807,399

(22) PCT Filed: Oct. 11, 2010

(86) PCT No.: PCT/CN2010/001590
§ 371 (c)(1),
(2), (4) Date: Feb. 25, 2013

(87) PCT Pub. No.: WO2012/000147
PCT Pub. Date: Jan. 5, 2012

(65) Prior Publication Data
US 2013/0160580 A1    Jun. 27, 2013

(30) Foreign Application Priority Data
Jul. 2, 2010    (CN) .......................... 2010 1 0215948

(51) Int. Cl.
F02B 75/06    (2006.01)
F04B 39/00    (2006.01)
(Continued)

(52) U.S. Cl.
CPC ............ F04B 39/0094 (2013.01); F01B 9/06 (2013.01); F02B 75/32 (2013.01); F04B 53/006 (2013.01);
(Continued)

(58) Field of Classification Search
USPC ......... 123/185.5, 185.6, 197.1, 197.2, 197.4, 123/193.1, 193.6, 61 R, 62, 61 V, 63,
(Continued)

(56) References Cited

U.S. PATENT DOCUMENTS 5,934,229 A    8/1999  Li et al. ....................... 123/55.5
5,943,987 A    8/1999  Fischer ........................ 123/55.5
(Continued)

FOREIGN PATENT DOCUMENTS

CN    85100358 A    8/1986
CN    85100359 A    8/1986
(Continued)

*Primary Examiner* — Lindsay Low
*Assistant Examiner* — Ruben Picon-Feliciano
(74) *Attorney, Agent, or Firm* — Fitzpatrick, Cella, Harper & Scinto

(57) ABSTRACT

A crank circular slider mechanism includes a crankshaft having at least one crank pin; at least one circular slider with an eccentric hole which fits over the crank pin; at least one reciprocating element with a circular slider-receiving hole, which receives the circular slider in a rotatable manner; and at least one dynamic balance rotary block with an eccentric hole that fits over the crank pin. The dynamic balance rotary block and the adjacent circular slider are fixed together. By means of proper selection of a mounting place and a mass of the dynamic balance rotary block, the mechanism can convert reciprocating inertia of the reciprocating element into rotation inertia so as to obtain a balancing effect. An internal combustion engine and a compressor may be equipped with the crank circular slider mechanism.

12 Claims, 2 Drawing Sheets

(51) Int. Cl.
*F16H 21/22* (2006.01)
*F02B 75/32* (2006.01)
*F16F 15/28* (2006.01)
*F16H 21/36* (2006.01)
*F01B 9/06* (2006.01)
*F04B 53/00* (2006.01)

(52) U.S. Cl.
CPC ........... *F16F 15/283* (2013.01); *F16H 21/22* (2013.01); *F16H 21/36* (2013.01); *Y10T 74/18208* (2015.01)

(58) Field of Classification Search
USPC ....... 123/53.6, 55.2, 55.4, 55.5, 55.3; 74/44, 74/45, 49, 48, 29
See application file for complete search history.

(56) References Cited

U.S. PATENT DOCUMENTS

| | | | | |
|---|---|---|---|---|
| 6,082,314 | A | 7/2000 | Li et al. | 123/55.4 |
| 6,619,926 | B2 * | 9/2003 | Manole | F04B 39/0094 417/53 |
| 7,219,500 | B1 * | 5/2007 | Rhodes | B01D 53/26 166/57 |
| 2007/0079698 | A1 * | 4/2007 | Raffaele | F01B 9/023 92/72 |
| 2009/0062065 | A1 * | 3/2009 | Field | B60W 30/18 477/37 |
| 2011/0197705 | A1 | 8/2011 | Li et al. | 74/595 |
| 2012/0160041 | A1 | 6/2012 | Li et al. | 74/49 |
| 2012/0266831 | A1 | 10/2012 | Li et al. | 123/54.4 |

FOREIGN PATENT DOCUMENTS

| | | |
|---|---|---|
| CN | 1144879 A | 3/1997 |
| CN | 1144880 A | 3/1997 |
| CN | 2859083 Y | 1/2007 |
| CN | 1982742 A | 6/2007 |
| CN | 101200041 A | 6/2008 |
| CN | 101392789 A | 3/2009 |
| CN | 101614158 A | 12/2009 |
| CN | 101691887 A | 4/2010 |
| JP | S48-29913 A | 4/1973 |
| JP | 2-278049 A | 11/1990 |
| JP | 11-500200 A | 1/1999 |
| WO | WO 2008/010490 A1 | 1/2008 |

* cited by examiner

CRANK CIRCULAR SLIDING BLOCK MECHANISM, PARTS THEREOF, AND EQUIPMENT THEREFROM

TECHNICAL FIELD

The invention relates to a reciprocating-rotary motion and inter-exchangeable mechanism, in particular, a crank circular-slider mechanism. The invention also provides a part designed for the crank circular slider mechanism. The invention also provides equipments using the crank circular slider mechanism.

BACKGROUND

Reciprocating internal combustion engines or compressors need to convert the reciprocating motion of the piston to the rotary motion of the crankshaft and vice versa. Wherein, the reciprocating internal combustion engines converts the reciprocating motion of the piston into the rotary motion of the crankshaft, on the other hand, the reciprocating compressor converts the rotary motion of the crankshaft into the reciprocating motion of the piston. Under the current general technology, the conversion process needs a crank linkage mechanism. Due to the presence of link rods in the crank linkage mechanism, the machines are bulky, heavy, and of poor balance performance.

To address these problems, a Chinese patent document CN85100358A discloses a "crank-circular slider reciprocating piston type internal combustion engine", Chinese patent CN85100359A discloses a "reciprocating piston type compressor with a crank circular slider". Chinese patent CN1144879A discloses a "crank double circular slider reciprocating piston type internal combustion engine". Chinese patent document CN1144880A discloses a "crank-multi-circular slider reciprocating piston type internal combustion engine". The common features of the internal combustion engine lie in a thorough improvement to the crank linkage mechanism of the internal combustion engine under the common technology by using a circular slider with an eccentric hole to replace the link rod. The eccentric circular slider has a cylindrical shape, and has an eccentric round hole parallel to the axis of the circular slider; the eccentric round hole is designed for passing through the crank pin of the crankshaft. The piston of the internal combustion engine comprises crowns at both of its ends and a guiding portion connecting the two crowns, wherein the guiding portion has a round hole thereon. The inner radial surface of the round hole mates with the outer radial surface of the circular slider, the circular slider is placed in the round hole which is on the guiding portion of the piston and cooperates with the outer circumference of the circular slider. When the piston moves reciprocally in the cylinder by the push caused by the combustion gas in the cylinder, the circular slider rotates around its own center, and in turn brings a reverse rotation to the crankshaft, and thus transforms the reciprocating motion of the piston into the rotary motion of the crankshaft, then the power is transmitted outward by the rotating components connected with the crankshaft. The teaching of above mentioned patents can also be applied to the compressors, to obtain a crank circular slider compressor.

In the crank double circular slider reciprocating piston internal combustion engine described in the above mentioned patent document CN1144879A and the "crank multi-circular slider reciprocating piston type internal combustion engine" disclosed in the Chinese patent document CN1144880A, one of the important advantages is that a better dynamic balance can be obtained by reciprocating dynamic balance sliders. However the technical solution using the dynamic balance slider requires that the body provides the dynamic balance slider with a guiding rail so as to realize a reciprocating motion. In many circumstances, the increased guiding rail for reciprocating motion will result in difficultly machining the body and impairing the strength and rigidity of the body so that it is difficult to realize it. And, a sliding friction is caused between the dynamic balance slider and the reciprocating guiding rail so as to reduce the transforming efficiency of power of the whole body.

Especially, utilizing single cylinder engine, the designer mainly take into account the simplicity and light weight of the structure of the single cylinder engine. If a dynamic balance slider is used as a dynamic balance element, a set of reciprocating mechanism needs to be added. In this case, such reciprocating rotary inter-exchangeable mechanism is hard to be named as a single cylinder mechanism and completely abandons the advantage of simplicity and light weight of the single cylinder mechanism.

SUMMARY

The invention provides a crank circular slider mechanism which can improve the dynamic balance of the whole mechanism without providing a dynamic balance slider so as to increase the rigidity and strength of the body, decreasing the complexity of body design. The above-mentioned crank circular slider mechanism provided in the invention can cause the crank circular slider mechanism to obtain the effect of complete balance in the case of selection of proper parameters and cooperation with balance weight located in the flying wheel or belt wheel. In particular when the crank circular slider mechanism is utilized in the single cylinder mechanism, the mechanism can obtain a complete dynamic balance in case of keeping the whole mechanism simple and light.

The invention also provides a part designed for the above mentioned crank circular slider mechanism and an equipment using the crank circular slider mechanism.

The invention provides a crank circular slider mechanism which comprises a crankshaft having at least one crank pin; at least one circular slider with an eccentric hole which fits over the crank pin of the crankshaft; at least one reciprocating element with circular slider-receiving hole, which receives the circular slider in a rotatable manner, the amount of the element is equal to that of the circular slider; and at least one dynamic balance rotary block with an eccentric hole which fits over the crank pin of the crankshaft, over the crank pin fits the circular slider, the dynamic balance rotary block and the adjacent circular slider fix each other.

Preferably, the dynamic balance rotary block has a mass center which meet the following requirements: projecting the axial center of the circular slider, the mass center of the dynamic balance rotary block and the axial center of the crank pin on the plane perpendicular to the axial line of the crankshaft, the projection points respectively are designated as A, B and C, the angle ACB is in the range of 90-270 degree.

Preferably, the angle ACB=180 degree; and AC=BC=e; wherein e is radius of the crank of the crankshaft and also is the eccentric distance of the circular slider.

Preferably, there is only one circular slider and one dynamic balance rotary block, wherein, the mass of the dynamic rotary block is that of the reciprocating element.

Preferably, there is only one dynamic balance rotary block and there are two circular sliders which respectively are located on each side of the dynamic balance rotary block and adjacent to the circular slider, the projections which the axial centers of the two dynamic balance rotary blocks are projected in the plane perpendicular to the axial line of the crankshaft are coincide; the mass of the dynamic balance rotary block is the sum of two reciprocating elements receiving the two circular sliders.

Preferably, there is only one circular slider, there are two dynamic balance rotary blocks which respectively are located on each side of the circular slider and adjacent to it. The projections which the axial centers of the two dynamic balance rotary blocks are projected in the plane perpendicular to the axial line of the crankshaft coincide. The masses of the two dynamic rotary blocks are identical, respectively equal to a half of the mass of the reciprocating element.

Preferably, the circular slider and the dynamic balance rotary block fix each other by a location pin.

Preferably, the crank circular slider mechanism is provided with a gear mechanism overcoming the moveable point.

The invention also provides a part used for the crank circular slider mechanism in any one of the solutions above mentioned. The part is the dynamic balance rotary block which is a mass part with an eccentric through hole.

Preferably, the mass center of the dynamic balance rotary block is away from the circle center of the eccentric hole by a distance e which is the radius of the crank of the crankshaft of the crank circular slider mechanism and also is the eccentric distance of the circular slider of the crank circular slider mechanism.

Preferably, the dynamic rotary block is a plat cylinder.

Preferably, the dynamic rotary block has a mass meeting the following requirements: when only one circular slider is attached fixedly to the dynamic rotary block, the mass is equal to the mass of the reciprocating element where the circular slider is located; when the two circular sliders are attached fixedly to the dynamic rotary block, the mass is equal to the total of the masses of two reciprocating elements where the two circular sliders are located respectively; when adopting two identical dynamic balance rotary blocks for attaching to one circular slider fixedly, the mass is a half of the mass of the reciprocating element where the circular slider is located.

The invention also provides an equipment, in particular, an internal combustion engine which uses the crank circular slider mechanism set forth in any one of the solutions above mentioned.

The invention also provides an equipment, in particular, a compressor which uses the crank circular slider mechanism set forth in any one of the solutions above mentioned.

In the crank circular slider mechanism provided by the invention comprises at least one circular slider and at least one dynamic balance rotary block; the dynamic balance rotary block is a mass part which fits over the same crank pin as the circular slider by the eccentric hole, and attaches fixedly to the circular slider. The arrangement of the dynamic balance rotary block provides the whole balance of the crank circular slider mechanism to be adjusted with a feasible technical way.

In the preferable solution of the invention, the dynamic balance rotary block will play a same role as the dynamic balance slider by properly selecting the mounting place and mass of the dynamic balance rotary block. In particular, the mounting place of the dynamic rotary block can be anticipated as follows: the dynamic balance rotary block is provided in such a manner that a phase difference between the circular slider and it is 180 degree, that is, the axial center of the circular slider, the mass center of the dynamic balance rotary block and the axial center of the crank pin all are projected in the plane perpendicular to the axial line of the crankshaft. The projection points respectively are designated by A, B and C in the schematic illustration shown in FIG. 5, the angle ACB=180 degree; meanwhile, provided AC=BC=e, e is the radius of the crank of the crankshaft and also is the eccentric distance of the circular slider. The mass of the dynamic balance rotary block (or the sum of the mass) is arranged so as to be equal to the mass (or the sum of the mass) of the reciprocating element where the dynamic balance slider is located. After such arrangement, the mass center point of the dynamic balance rotary block moves to and fro and linearly. When analyzing the dynamic balance of the mechanism, the dynamic balance rotary block can be considered to be equivalent to a mass point located in the mass center, therefore, the movement of the dynamic balance rotary block is transformed to a to and fro and linear movement, that is, the role that the dynamic balance rotary block in the balance system of the whole dynamic mechanism is completely same as the dynamic balance slider in the "crank double circular slider reciprocating piston type internal combustion engine" disclosed in CN1144879A and "crank multi-circular-slider reciprocating piston type internal combustion engine" disclosed in CN1144880A. In so doing, the movement of the dynamic balance rotary block and reciprocating movement of the reciprocating elements where the circular slider that attaches fixedly to the dynamic balance rotary block locate can be combined into a centrifugal force towards the crank pin from the center of the crankshaft. In this way, it is possible to make the whole mechanism a complete balance easily by providing the belt wheel or the flying wheel with a balance counter weight. The detailed analytical process of the said combination of the reciprocating motion into the centrifugal force is disclosed in the said patent documents and hence it goes without saying. It is apparent that the effect of adoption of the dynamic balance rotary block to the balance of the mechanism is the same as that of adoption of the dynamic balance slider. However, when adopting the dynamic balance slider, it is necessary to provide the body with a reciprocating guiding rail thereon so that the structure of the body is too complex. On the other hand, in the way of adoption of the dynamic balance rotary block, the body only needs leave a sufficient space of rotation for the dynamic balance rotary block as long as the motion interference is avoided. Therefore, the way of adopting the dynamic balance rotary block reduces designing difficulty of the body, meanwhile it is possible to avoid the influence to the rigidity or strength of the body due to the reciprocating guiding rail. Additionally, in the mechanism adopting dynamic balance slider, a huge friction is produced between the dynamic balance slider and the reciprocating guiding rail. However after adopting the dynamic balance rotary block, the friction does not exist, increasing the power transforming efficiency of the mechanism.

After adopting the mechanism, it is possible to adjust the inertia balance of the whole crank circular slider mechanism by properly increasing or decreasing the mass of the dynamic balance rotary block according to the results of the dynamic balance tests. Therefore, the structure also have an advantage of readily adjusting the dynamic balance.

DETAILED DESCRIPTION OF THE BEST CARRIED OUT MODES

Figure 1:
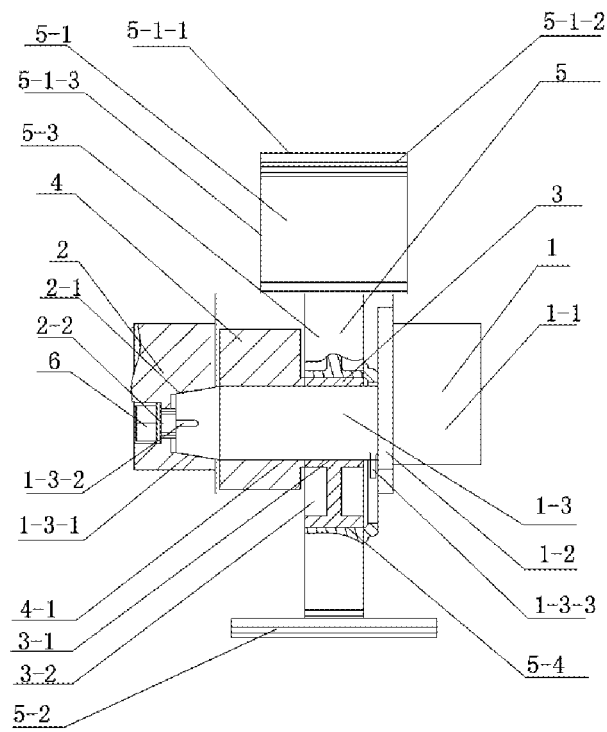
FIG. 1 is a schematic view of the crank circular slider mechanism of the first embodiment of the invention.
Figure 2:
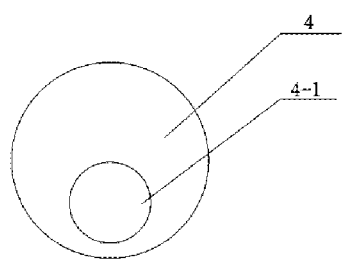
FIG. 2 is a front view of a dynamic balance rotary block used in FIG. 1.
Figure 3:
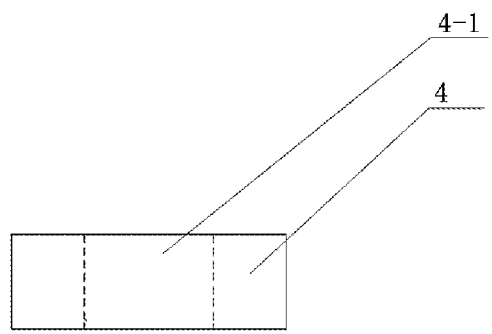
FIG. 3 is a top view of a dynamic balance rotary block used in FIG. 1.

FIG. 1 shows the section of the dynamic mechanism of a crank circular slider reciprocating piston style internal combustion engine provided by the first embodiment of the invention, that is, the crank circular slider mechanism. In the FIG. 1, the main parts of the crank circular slider mechanism within the internal combustion engine and relationship therebetween can be seen. In order to illustrate some particular sections, several portions are partially cut in the figure, please refer to FIG. 2 and FIG. 3. FIG. 2 is a front view showing a dynamic balance rotary block the mechanism uses; FIG. 3 is a top view showing the dynamic balance rotary block.

The internal combustion engine is a two-stroke diesel engine utilizing graded type piston, reflected by the dynamic mechanism illustrated in FIG. 1. It is clear that piston 5 is a double function piston whose piston heads respectively have different diameters. In conjunction with FIG. 1, a detailed description is given below.

As seen in FIG. 1, the crank circular slider mechanism comprises a single throw 1 and a crank 2 which together form the crankshaft, a circular slider 3, a dynamic balance rotary block 4 and a piston 5.

The single throw 1 comprises from the right side to the left side in FIG. 1 a main journal 1-1 of the single throw, a crank arm 1-2, a crank pin 1-3, whose axial lines are parallel to each other and which connect to each other by sequence, the said three portions each are cylinders. Wherein, the single throw main journal 1-1 is coaxial with the crank arm 1-2, the crank arm 1-2 has a larger diameter and a shorter axial length and constitutes the protruded portion of the inside end of the single throw main journal 1-1. The crank pin 1-3 has an axial line which is offset on the side of the single throw main journal 1-1 and is separated from the axial line of the single throw main journal by a distance e. The diameter of the crank pin is less than that of the single throw main journal; the crank pin 1-3 has an extreme end which is a tapering end 1-3-1. The tapering end 1-3-1 has an end face where a screw hole is provided as a location structure. Moreover, along the tapering surface of the tapering end 1-3-1 are provided two first semi-circular pin hole 1-3-2 respectively arranged on both sides and opened on the end face. An outer toothed segment 1-3-3 is provided in the root of the crank pin 1-3. The segment 1-3-3 is designed to cooperate with the inner toothed segment placed on the waist of the piston so as to avoid the mathematical singularity.

The crank 2 is a cylinder and is provided with a tapering hole 2-1 whose axial line is parallel to the main axial line of the crank 2 and which has an eccentric distance e. the tapering hole 2-1 is placed eccentrically. Its taper matches that of the conical end at the end of the crank pin 1-3, its larger end opens into the inner end face of the crank of the crankshaft 1-3, its smaller end is in the crank 2 so as to form a bottom. The crank 2 is provided with a crank bolt hole 2-2 on the outer end face thereof and on the position coaxial with the tapering hole 2-1. The crank bolt hole 2-2 has a bottom designed to provide the crank bolt 6 with a location surface; the crank bolt hole 2-2 has a bottom which is communicated with that of the tapering hole 2-1 by a connection hole situated in the common axial line between them. The said tapering hole 2-1 is also provided with two second semi-circular pin hole on the inner diameter surface, which correspond to the said first semi-circular pin hole 1-3-2.

When the crankshaft 2 and the single throw 1 are combined to the crankshaft, the connection are made in accordance with the following steps. The crank 2 fits over the tapering end 1-3-1 at the end of the crank pin 1-3; then the first semi-circular pin hole 1-3-2 is aligned with the second semi-circular pin hole so as to form a complete location pin hole in which a location pin is inserted. Finally, the crank bolt 6 is screwed into the screw hole at the end of the crank pin 1-3 by the crank bolt hole 2-2, so that the crank 2 and the single throw 1 form a complete crankshaft. At the same time, the crank 2 is coaxial with the single throw main journal 1-1 of the single throw 1, their common axis is a rotation axis of the crank, or is named by the axis of the crankshaft; the crankshaft has a crank radius e. the crank radius is the distance between the rotation axis of the crankshaft and the axis of the crank pin. Apparently, prior to combination, the crank pin is fit over by a piston, the circular slider, the dynamic balance rotary block and other parts. In fact, it is in order to easily mount the above mention parts on the crankshaft that the said combination crankshaft is adopted. The separable crankshaft having a single throw is the subject matter of an application of the present applicant, it goes without saying. Generally speaking, the crank 2 and the single throw 1 eventually are combined to form a complete crankshaft.

The circular slider 3 is a plat cylinder having an eccentric hole 3-1 which has an eccentric distance e. the circular slider 3 fits over the crank pin 1-3 of the single throw 1 through the eccentric hole 3-1. The circular slider 3 is required to be light weight and hence is provided with several duplication-removal groove 3-2. The circular slider 3 has a mass center which is required to be in the circle center of the eccentric hole 3-1. Therefore, the eccentric hole 3-1 has a thicker circumferential edge so as to increase the weight of the portion. The circular slider 3 is mounted in the reception hole 5-4 for receiving the circular slider of the piston 5.

The piston 5 is a double function piston. Its upper end is first piston head 5-1 whose structure and function are similar to the those of the piston of the current crank linkage mechanism, having a top 5-1-1, a head 5-1-2 and a skirt 5-1-3 etc, whose function is to form a combustion chamber with the air cylinder and to bear the bombardment pressure of the combustible blended gas so as to cause a to and fro movement. The piston 5 has another end which is a second piston head 5-2. Since the internal combustion engine adopts a graded type piston, the diameter of the second piston head 5-2 is notably larger than the first piston head 5-1. The second piston head 5-2 has a thinner thickness. The second piston head 5-2 has a function of sweeping piston, which supplies the sweeping air flux with larger pressure to the second stroke internal combustion engine through cooperation with the sweeping air cylinder of the body. Between the first piston head 5-1 and the second piston head 5-2 is provided a connection portion 5-3 connecting the first piston head 5-1 and the second piston head 5-2, which is a thinner sheet on which a reception hole 5-4 receiving the circular slider. The piston 5 has a structure enabling itself play roles of piston of internal combustion engine and piston of the compressor at the same time, especially suited for the two-stroke internal combustion engine.

The dynamic balance rotary block 4 is a plat cylinder on which is provided a second eccentric hole 4-1 which is inserted by the crank pin 1-3. The dynamic balance rotary block 4 and the circular slider 3 are fixedly connected by means of any proper solution in prior art, such as two fixing pins (as seen in FIG. 1) arranged in axial direction connecting the dynamic balance rotary block 4 and circular slider 3 as an integral part. When using the connection way, it is necessary to arrange respective pin holes in the dynamic balance rotary block 4 and the circular slider 3. The mass center of the dynamic balance rotary block 4 is away from the circle center of the second eccentric hole 4-1 by a distance e.

In order to obtain an ideal effect of dynamic balance, in other words, conversion of reciprocating inertia of the circular slider 3 and piston 5 into rotary inertia of them, it is necessary to properly select the location relationship between the dynamic balance rotary block 4 and circular slider 3 and the mass of the dynamic balance rotary block.

Figure 5:
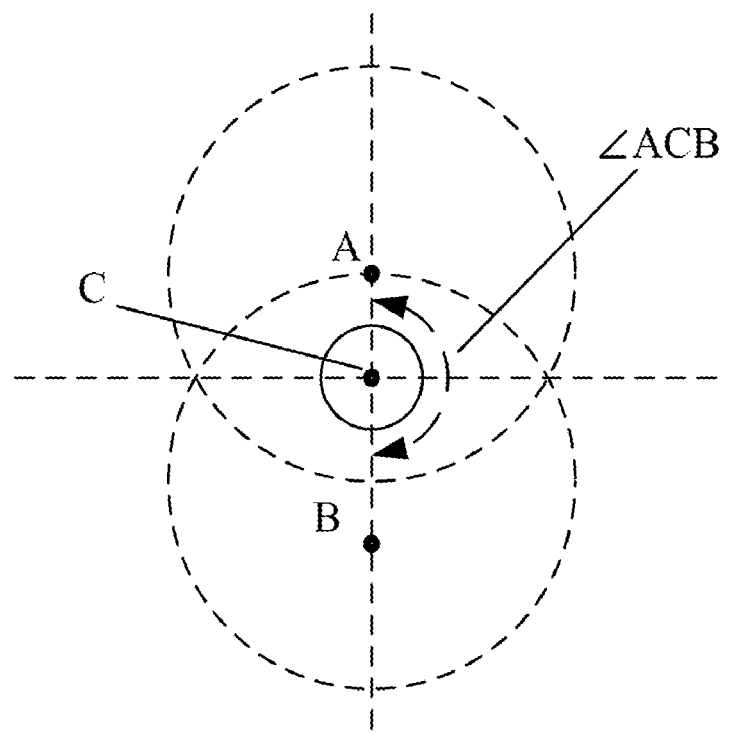
FIG. 5 is a schematic view of projection points of an axial center of a circular slider, a mass center of a dynamic balance rotary block, and an axial center of a crank pin in a plane vertical to an axial line of a crankshaft, according to an embodiment of the present invention.

By the selection of location relationship, we mean that a phase difference 180 degree is provided between the dynamic balance rotary block 4 and the circular slider 3. The phase difference 180 degree can also be explained as follows: project the axial center of the circular slider 3, the mass center of the dynamic balance rotary block 4, the axial center of the crank pin on the plane perpendicular to the axial line of the crankshaft to get the projection points respectively A, B, C, then the angle ACB is equal 180 degree. FIG. 5 shows schematically the projection points of the axial center of the circular slider, the mass center of the dynamic balance rotary block, and the axial center of the crank pin in a plane perpendicular to an axial line of the crankshaft, wherein A is the projection point of the axial center of the circular slider, B is the projection point of the mass center of the dynamic balance rotary block, and C is the projection point of the axial center of the crank pin, and wherein the angle ACB is 180 degrees. Since the eccentric distances of the circular slider 3 and the dynamic balance rotary block 4 are e, the point C just located at the middle place between points A and B. the distances between A and C and between B and C are equal to the crank radius e.

The mass of the dynamic balance rotary block 4 is set to be equal to the mass of the piston 5. After the mass and the place relationship is adopted, the dynamic balance rotary block 4 substantially completely replaces the dynamic balance slider in "crank dual circular slider reciprocating piston type internal combustion engine" disclosed in Chinese patent CN1144879A mentioned in the top of the specification. The effect it brings about to the dynamic balance of the whole mechanism is the same as the dynamic balance slider. In other words, the mass center of the dynamic balance rotary block will reciprocate along the linear track perpendicular to the direction in which the piston 5 assemble moves. The combination of the both results in a centrifugal force directing to the center of the crank pin from the center of the crankshaft. In this case, it is possible to provide flying wheel or belt wheel or the similar part with balance counterweight as required so as to conveniently realize the complete balance of the whole mechanism.

Since the mass of the dynamic balance rotary block 4 is equal to the mass of the piston 5, the mass of the dynamic balance rotary block 4 is larger. FIG. 1 shows that the dynamic balance rotary block is very thick and solid without duplication removal grooves like the circular slider 3. In this way, a large mass can be obtained when the volume of the dynamic balance rotary block is smaller.

Although the use of the dynamic balance rotary block can get the same balance effect as the use of the dynamic balance slider, the structure of the former can not resolve the problem of mathematical singularity of the crank circular slider mechanism during movement. Thus, it is necessary to add a gear structure overcoming the mathematical singularity when individually utilizing the dynamic balance rotary block as a balance element. By the mathematical singularity, we mean that the circle center of the rotation axis of the crankshaft and the circle center of the circular slider completely overlap when the circular slider is located in the phase of 90 degree or 270 degree resulting possibly in the circular slider rotating about the rotation axis not reciprocating so that the movement of the piston is indefinite. The above problems usually occur at the start, causing the internal combustion engine or the compressor to abnormally start. Once starting, the reciprocating inertia of the piston is dependable to drive the mechanism to pass the mathematical singularity avoiding the uncertainty of the movement of the mechanism. When using dynamic balance slider, it is impossible that the circular sliders fixing each other are placed at the mathematical singularity at the same time. Therefore, the circular slider placed in the mathematical singularity can overcome it through the movement of the other circular slider so as to solve the problem. After the dynamic balance rotary block of the invention is used, the above mechanism no long exists, it is necessary to propose a special mechanism to overcome the mathematical singularity.

In FIG. 1, the outer toothed segment 1-3-3 at the foot of the crank pin is a portion overcoming the mathematical singularity, the segment is provided with two teeth. Corresponding to it, an inner toothed segment in mesh with the outer toothed segment is provided on the waist of the piston. The inner toothed segment is provided with at least three teeth. The inner and outer toothed segments together constitute a mechanism overcoming the mathematical singularity. By it, the mathematical singularity problem can be resolved by plucking the piston to pass the mathematical singularity through the cooperation of the inner and outer toothed segments when the circular slider is placed at the phase of 90 degree or 270 degree.

The above embodiment is a preferred one, using the dynamic balance rotary block with the said position and mass, theoretically, converts the reciprocation and rotation inertias of the whole crank circular slider mechanism into a centrifugal inertia directing to the center of the crank pin from the center of the crankshaft, so as to facilitate to set the balance counter weight and to finally obtain a better dynamic balance effect.

If only desiring to improve the dynamic balance by the dynamic balance rotary block not requiring to reach a optimal effect, the requirement to the place and mass of the said dynamic balance rotary block can be loosened. Such as the place relationship can be up to the angle ACB ranging from 90 degree to 270 degree. In this state, the selection of a proper mass will improve partially the balance effect. It requires that a proper mass of the dynamic balance rotary block is selected. In usual circumstance, since the dynamic balance rotary block is provided, it is advantageous if a best dynamic balance effect is obtained; in this sense the requirement above mentioned in the preferred embodiments will be recommended.

Moreover, a mechanism overcoming mathematical singularity is provided in the embodiments; since a fault movement appears at the mathematical singularity with a small probability and takes place at the start and hence can be overcome by swinging the crankshaft at start. Therefore, no mechanism overcoming the mathematical singularity is provided possibly. Of course usually such mechanism is necessary.

Principally, the said optimal balance effect is brought about by locating the mass center and mass of the dynamic balance rotary block to meet the said requirements. Its profile can be provided randomly as long as it does not interfere with other portion of the crank circular slider mechanism in terms of the movement. Actually, considering the ease of manufacturing, the dynamic balance rotary block has a profile that usually is similar to that of the circular slider but the duplication removal grooves are omitted so that an ideal quality meeting the requirements is reached under a small size.

The first embodiment above mentioned corresponds to the example of dual circular slider mechanism. In practice, "crank multi-circular slider reciprocating piston type internal combustion engine" disclosed in CN1144880A can be adapted in such a manner that the assemble of the dynamic balance slider situated between two circular sliders is replaced by the above mentioned dynamic balance rotary block so as to obtain a crank circular slider mechanism with a dynamic balance rotary block; in this circumstance, a dual-cylinder or quadric-cylinder internal combustion engine can be obtained as a function of dual-function piston or sing-function piston depending on the piston. At the same time, the axial center of the two circular sliders project overlapping shadows in the plane perpendicular to the axial line of the crankshaft; the mass of the dynamic balance rotary block is equal to the sum of the masses of the pistons where the two circular slider lie. When using this solution, it also needs a mechanism overcoming the mathematical singularity. In another solution, a dynamic balance rotary block replaces assemble of the right and left pistons; in the place of the middle circular slider is provided an assemble of pistons. Therefore an internal combustion engine with a piston is obtained. The second embodiment of the invention provides the crank circular slider mechanism designed for the two-stroke internal combustion engine.

Figure 4:
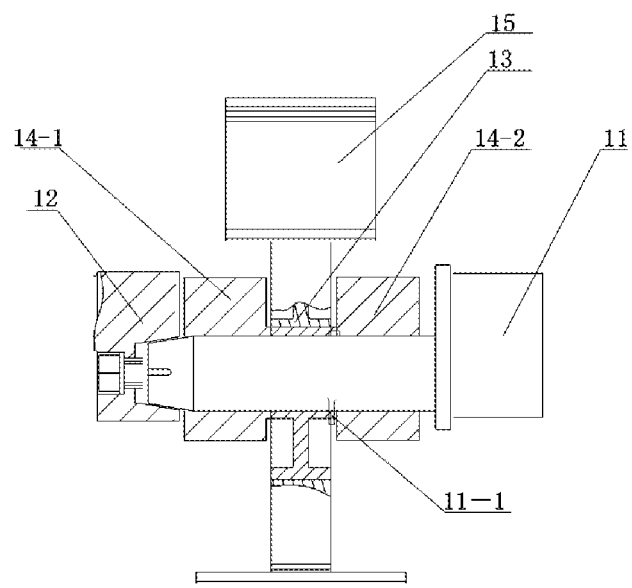
FIG. 4 is a schematic view of the crank circular slider mechanism in the second embodiment of the invention.

Please refer to FIG. 4, a crank circular slider mechanism comprises the first dynamic balance rotary block 14-1, the second dynamic balance rotary block 14-2, the piston 15, the circular slider 13, the single throw 11 and the crank 12, which form together a combination type crankshaft, characterizing by the circular slider 13 and the piston 15 being mounted in the middle place of the mechanism. The first dynamic balance rotary block 14-1 and the second dynamic balance rotary block 14-2 are attached to the circular slider as an integral part on both sides. In this mechanism, the outer toothed segment overcoming the mathematical singularity on the crank pin is transferred to the middle part of the crank pin so that it can be placed in the end face of the circular slider 13 after its mounting. The circular slider 13 or the dynamic rotary block can be of split type in which it is split into top and bottom sections along the location of the eccentric hole in order that the impossible mounting into the eccentric hole due to the hindrance of the outer toothed segment is avoided.

When using the embodiment, the first dynamic balance rotary block 14-1 and the second dynamic balance rotary block 14-2 are completely identical dynamic balance rotary blocks and their masses respectively are a half of the piston, the distance between the mass center and the eccentric hole center is e. Thus, the movement of the first dynamic balance rotary block 14-1 and the second dynamic balance rotary block 14-2 can be combined with the reciprocating movement of the piston 15 into a centrifugal force directing to the center of the crank pin from the center of the crankshaft, so that the balance of the reciprocating movement inertia of the piston 15 is converted into a balance of the rotary centrifugal force. Therefore, the balance of the mechanism is easily achieved. The mechanism is similar to the first embodiment in other aspects, no description thereto is necessary.

The above mentioned is only the preferred embodiments of the present invention, it should be noted that the skilled in the art can also make many improvements and modifications without departure from the basic theory of the present invention, these improvements and modifications will be also be considered as the protections scope of the invention.

The invention claimed is:

1. A crank circular slider mechanism comprising:
   a crankshaft including a crank pin;
   a circular slider that fits over the crank pin through an eccentric hole;
   a reciprocating element with a circular slider receiving hole, which receives the circular slider in a rotatable manner; and
   a dynamic balance rotary block constituting a mass part that fits over the crank pin through an eccentric hole,
   wherein the dynamic balance rotary block does not contact the reciprocating element,
   wherein the dynamic balance rotary block and the circular slider are fixed to each other, such that the dynamic balance rotary block rotates together with the circular slider,
   wherein a mass center of the dynamic balance rotary block is arranged such that projection points, projecting from an axial center of the circular slider, the mass center of the dynamic balance rotary block, and an axial center of the crank pin onto a plane perpendicular to an axial line of the crankshaft, respectively are designated by A, B, and C, the projection points forming an angle ACB that is in a range of 90-270 degrees,
   wherein a segment length AC equals a segment length BC equals a length e,
   wherein e is a radius of a crank of the crankshaft, and
   wherein e is an eccentric distance of the circular slider.

2. A crank circular slider mechanism according to claim 1, wherein the angle ACB equals 180 degrees.

3. A crank circular slider mechanism according to claim 1,
   wherein the mechanism includes only one circular slider and only one dynamic balance rotary block, and
   wherein a total mass of the dynamic balance rotary block equals a total mass of the reciprocating element corresponding to the circular slider.

4. A crank circular slider mechanism according to claim 1,
   wherein the mechanism includes two circular sliders that respectively are located on sides of the dynamic balance rotary block and adjacent to the dynamic balance rotary block,
   wherein, when axial centers of the two circular sliders are projected onto the plane perpendicular to the axial line of the crankshaft to form projections, the projections coincide, and
   wherein a total mass of the dynamic balance rotary block equals a sum of total masses of two reciprocating elements corresponding to the two circular sliders.

5. A crank circular slider mechanism according to claim 1,
wherein the mechanism includes two dynamic balance rotary blocks respectively located on sides of the circular slider and adjacent to the circular slider,
wherein projections of axial centers of the two dynamic balance rotary blocks onto the plane perpendicular to the axial line of the crankshaft overlap, and
wherein the two dynamic balance rotary blocks have a same total mass respectively equal to half of a total mass of the reciprocating element corresponding to the circular slider.

6. A crank circular slider mechanism according to claim 1, wherein the circular slider and the dynamic balance rotary block are fixed to each other by a positioning pin.

7. A crank circular slider mechanism according to claim 1, further comprising a gear device structured to overcome a mathematical singularity.

8. A crank circular slider mechanism according to claim 1, wherein the mechanism is incorporated in equipment.

9. An internal combustion engine comprising a crank circular slider mechanism, the mechanism including:
a crankshaft including a crank pin;
a circular slider that fits over the crank pin through an eccentric hole;
a reciprocating element with a circular slider receiving hole, which receives the circular slider in a rotatable manner; and
a dynamic balance rotary block constituting a mass part that fits over the crank pin through an eccentric hole,
wherein the dynamic balance rotary block does not contact the reciprocating element,
wherein the dynamic balance rotary block and the circular slider are fixed to each other, such that the dynamic balance rotary block rotates together with the circular slider,
wherein a mass center of the dynamic balance rotary block is arranged such that projection points, projecting from an axial center of the circular slider, the mass center of the dynamic balance rotary block, and an axial center of the crank pin onto a plane perpendicular to an axial line of the crankshaft, respectively are designated by A, B, and C, the projection points forming an angle ACB that is in a range of 90-270 degrees,
wherein a segment length AC equals a segment length BC equals a length e,
wherein e is a radius of a crank of the crankshaft, and
wherein e is an eccentric distance of the circular slider.

10. A compressor comprising a crank circular slider mechanism, the mechanism including:
a crankshaft including a crank pin;
a circular slider that fits over the crank pin through an eccentric hole;
a reciprocating element with a circular slider receiving hole, which receives the circular slider in a rotatable manner; and
a dynamic balance rotary block constituting a mass part that fits over the crank pin through an eccentric hole,
wherein the dynamic balance rotary block does not contact the reciprocating element,
wherein the dynamic balance rotary block and the circular slider are fixed to each other, such that the dynamic balance rotary block rotates together with the circular slider,
wherein a mass center of the dynamic balance rotary block is arranged such that projection points, projecting from an axial center of the circular slider, the mass center of the dynamic balance rotary block, and an axial center of the crank pin onto a plane perpendicular to an axial line of the crankshaft, respectively are designated by A, B, and C, the projection points forming an angle ACB that is in a range of 90-270 degrees,
wherein a segment length AC equals a segment length BC equals a length e,
wherein e is a radius of a crank of the crankshaft, and
wherein e is an eccentric distance of the circular slider.

11. An internal combustion engine according to claim 9, wherein a total mass of the dynamic balance rotary block is equal to a total mass of the reciprocating element.

12. A compressor according to claim 10, wherein a total mass of the dynamic balance rotary block is equal to a total mass of the reciprocating element.

* * * * *